(12) United States Patent  (10) Patent No.: US 7,436,432 B2
Kayahara et al.  (45) Date of Patent: Oct. 14, 2008

(54) SIGHT LINE INDUCING INFORMATION DISPLAY DEVICE, SIGHT LINE INDUCING INFORMATION DISPLAY PROGRAM AND SIGHT LINE INDUCING INFORMATION DISPLAY METHOD

(75) Inventors: Naoki Kayahara, Chino (JP); Hiroaki Sakai, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 885 days.

(21) Appl. No.: 10/893,498

(22) Filed: Jul. 19, 2004

(65) Prior Publication Data

US 2005/0052408 A1 Mar. 10, 2005

(30) Foreign Application Priority Data

Jul. 17, 2003 (JP) ............................. 2003-198365
May 26, 2004 (JP) ............................. 2004-156307

(51) Int. Cl.
*H04N 17/00* (2006.01)
(52) U.S. Cl. ............................ 348/180; 348/61; 348/78; 348/116; 348/39; 345/581; 382/206; 382/112
(58) Field of Classification Search .................. 348/61, 348/78, 95, 116, 39, 54, 180; 345/581, 588, 345/156; 382/112, 170, 206, 286
See application file for complete search history.

(56) References Cited

U.S. PATENT DOCUMENTS

| | | | | |
|---|---|---|---|---|
| 5,692,008 A | * | 11/1997 | Van Nee | 375/148 |
| 5,742,264 A | * | 4/1998 | Inagaki et al. | 345/8 |
| 5,758,201 A | * | 5/1998 | Watanabe et al. | 396/51 |
| 5,983,029 A | * | 11/1999 | Yamada et al. | 396/51 |
| 6,516,154 B1 | * | 2/2003 | Parulski et al. | 396/287 |
| 6,700,578 B2 | * | 3/2004 | Kamata et al. | 345/473 |
| 6,714,198 B2 | * | 3/2004 | Kamata et al. | 345/427 |
| 6,762,789 B1 | * | 7/2004 | Sogabe et al. | 348/36 |
| 6,774,900 B1 | * | 8/2004 | Kubota et al. | 345/473 |

OTHER PUBLICATIONS

Tanaka et al., Shoji, "A Study on an Attractiveness Evaluation Model based on the Physical Features of Image Regions," Technical Report of IEICE, pp. 1-8, 1999, with Abstract and Translation.

* cited by examiner

*Primary Examiner*—David Ometz
*Assistant Examiner*—Jean W Désir
(74) *Attorney, Agent, or Firm*—Oliff & Berridge, PLC

(57) ABSTRACT

Aspects of the invention can provide a sight line inducing information display device, a sight line inducing information display program and a sight line inducing information display method able to precisely estimate the flowing direction of a sight line of an observer from the arrangement of partial areas itself. After image information of a visual document, etc. is divided into partial areas and is recognized, an initial noticing probability every partial area, its sight line inducing direction and its probability can be respectively calculated. The initial noticing probability, its sight line inducing direction and the probability can be respectively displayed. On the basis of these displays, the flowing path of the sight line of the user observing this visual document can be estimated. Thus, the flowing direction of the sight line of the observer can be precisely estimated from the arrangement of the partial areas itself.

21 Claims, 10 Drawing Sheets

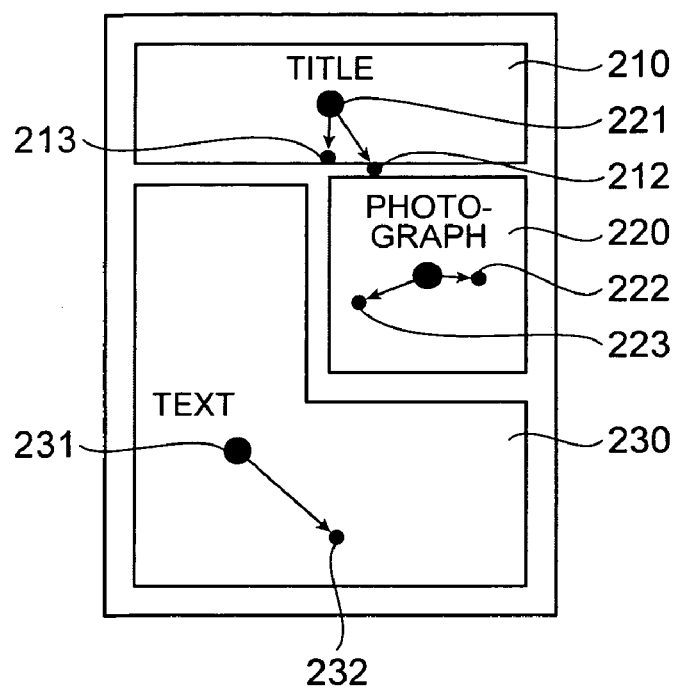
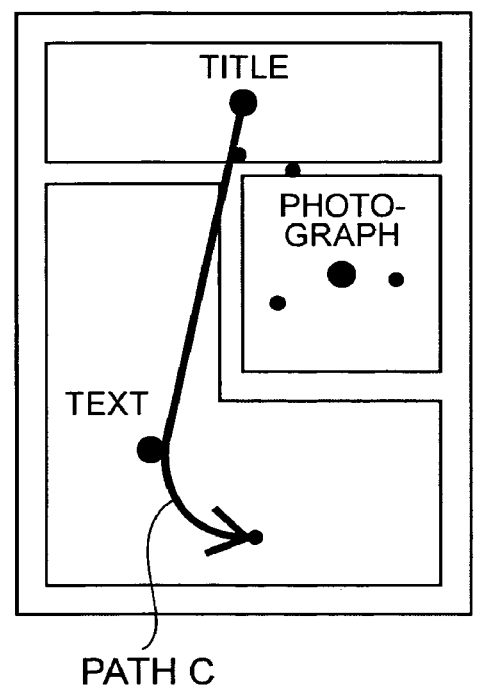
FIG. 10A
FIG. 10B

SIGHT LINE INDUCING INFORMATION DISPLAY DEVICE, SIGHT LINE INDUCING INFORMATION DISPLAY PROGRAM AND SIGHT LINE INDUCING INFORMATION DISPLAY METHOD

BACKGROUND OF THE INVENTION

1. Field of Invention

Aspects of the invention relate to a sight line inducing information display device, a sight line inducing information display program and a sight line inducing information display method for precisely estimating the flow (eye flow) of a sight line of an observer in making a document, such as a product catalogue, a Web page, and the like.

2. Description of Related Art

In a document (hereinafter suitably also called a visual document) for improving a design property by precisely arranging a title, a photograph, a sentence, an illustration, etc., there is generally a case in that its quality of the finished product has a great influence on goods, an image and sale with respect to an enterprise. Therefore, the production area of such a visual document is conventionally an area in which a person having a special skill and a design sense called a graphic designer, etc. exclusively undertakes this production. Many design companies having this production as a dedicated work are also actually established.

A technique called so-called control of the eye flow as one of techniques conscious in making the visual document by such a professional designer. In this control of the eye flow, the eye flow is controlled as to how to flow the sight line of an observer (hereinafter suitably also called a reader or a user in this specification) actually observing the visual document.

Namely, when the professional designer arranges plural partial areas (hereinafter suitably also called document parts) of the title, the sentence, the photograph, the illustration, etc. on one display face, it is considered that the professional designer experientially grips the characteristics of the flow of the sight line of a human being as well as the relation of information between these partial areas. It is also considered that the professional designer designs the visual document for satisfying a client and the reader by consciously or unconsciously using experiential know-how as to the arrangement in which the visual document can be most clearly and beautifully laid out, etc.

Therefore, it is considered that the accurate estimate of the flow of the sight line of such an observer is first an important point to make the visual document of high quality by a normal business man, etc. having no (little) experience of design development, etc. relating to the visual document. For example, techniques as shown by, for example, in JP-A-2002-175290 and JP-A-6-162 etc., are conventionally proposed as techniques relating to the eye flow of such an observer.

SUMMARY OF THE INVENTION

These conventional techniques are techniques for applying a conventional detecting method of the eye flow in which the sight line of the observer is actually measured by an eye camera, etc. and the flow of the sight line is calculated. Accordingly, it is impossible to estimate the eye flow of the observer from the arrangement of each document parts itself.

Therefore, aspects of the invention are made to effectively solve such a problem, and an object is to provide a novel sight line inducing information display device, a novel sight line inducing information display program and a novel sight line inducing information display method able to precisely estimate the eye flow of the observer from the arrangement of the document parts (partial area) itself.

An exemplary sight line inducing information display device of the invention can include a sight line inducing information calculating device that calculates sight line inducing information from image information, and a sight line inducing information display device for displaying the sight line inducing information calculated by the sight line inducing information calculating device. Thus, sight line inducing information for judging the flow of the sight line is obtained as described below from only image information of an ordinary document, a writing, an image, an album, etc. as well as the above visual document. Further, this sight line inducing information can be clearly displayed to a user.

The image information in the invention is information able to be visually recognized in which plural partial areas are arranged as a list on one layout face (display face). For example, the image information in the invention is an electronic document already shaped, a catalogue, a poster, a chart, etc. in addition to a visual document, an ordinary document, a writing, the image and the album as mentioned above. This partial area is each element constituting the above image information, e.g., a title, a sentence, a photograph, an illustration, etc. as mentioned above irrespective of largeness and smallness of its shape and area. The same contents also hold true in the following sight line inducing information display device, sight line inducing information display program and sight line inducing information display method.

An exemplary sight line inducing information display device can further include that the sight line inducing information calculating device has partial area recognizing device for recognizing said inputted image information by dividing said inputted image information into partial areas, and said sight line inducing information display device has output device for displaying an initial noticing probability every said partial area.

Namely, in the invention, after the above image information is divided into the partial areas and is recognized by the partial area recognizing device of the above sight line inducing information calculating device, the output device of the above sight line inducing information display means displays the initial noticing probability every said partial area. Thus, the sight line inducing information for judging the flow of the sight line is obtained as mentioned above from only the image information of an ordinary document, a writing, an image, an album, etc. as well as the above visual document. Further, this sight line inducing information can be clearly displayed to a user.

In the exemplary sight line inducing information display device the sight line inducing information calculating device can have a partial area recognizing device for recognizing said inputted image information by dividing said inputted image information into partial areas, and said sight line inducing information display device can have an output device for displaying a sight line inducing direction every said partial area and its probability.

Namely, in the present invention, after the above image information is divided into the partial areas and is recognized by the partial area recognizing device of the above sight line inducing information calculating device, the output device of the above sight line inducing information display device displays the sight line inducing direction every partial area and its probability. Thus, the sight line inducing information for judging the flow of the sight line can be obtained as mentioned above from only the image information of an ordinary document, a writing, an image, an album, etc. as well as the above visual document. Further, this sight line inducing information can be clearly displayed to a user.

In the exemplary sight line inducing information display device the sight line inducing information calculating device can have a partial area recognizing device for recognizing the inputted image information by dividing the inputted image information into partial areas, and the sight line inducing information display device can have an output device for respectively displaying an initial noticing (attention-catching) probability every said partial area, and a sight line inducing direction every said partial area and its probability.

Namely, in the invention, after the above image information is divided into the partial areas and is recognized by the partial area recognizing device of the above sight line inducing information calculating device, the output device of the above sight line inducing information display device respectively displays the initial noticing probability every each partial area, and the sight line inducing direction every each partial area and its probability.

Thus, the sight line inducing information for judging the flow of the sight line is obtained as mentioned above from only the image information of an ordinary document, a writing, an image, an album, etc. as well as the above visual document. Further, this sight line inducing information can be clearly displayed to a user.

In the exemplary sight line inducing information display device of the sight line inducing information calculating device generates an initial noticing probability every partial area constituting said inputted image information, or generates a sight line inducing path from a sight line inducing direction every partial area and its probability, and the sight line inducing information display device displays the initial noticing probability every the partial area, or the sight line inducing path generated by the sight line inducing information calculating device. Thus, the sight line inducing information for judging the flow of the sight line is obtained as mentioned above from only the image information of an ordinary document, a writing, an image, an album, etc. as well as the above visual document. Further, this sight line inducing information can be clearly displayed to a user.

In the exemplary sight line inducing information display device a sight line inducing information display device for estimating and displaying the flowing path of a sight line of a user observing image information having plural partial areas arranged as a list, and can include a sight line inducing direction calculating device for obtaining an initial noticing probability every said partial area, and a sight line inducing direction every said partial area and its probability, and an output device for respectively displaying the initial noticing probability every partial area obtained by said initial noticing probability calculating device, and the sight line inducing direction every partial area and its probability calculated by said sight line inducing direction calculating device. Namely, in the invention, the above sight line inducing direction calculating device itself does not calculate the sight line inducing path from the initial noticing probability every partial area, or the sight line inducing direction every partial area and its probability, but receives these information from the exterior.

Thus, the sight line inducing information for judging the flow of the sight line is obtained from only the image information of an ordinary document, a writing, an image, an album, etc. as well as the above visual document. Further, this sight line inducing information can be clearly displayed to a user.

The sight line inducing information display device can be a sight line inducing information display device for estimating and displaying the flowing path of a sight line of a user observing image information having plural partial areas arranged as a list, and can include an input device for inputting said image information, a partial area recognizing device for recognizing said inputted image information by dividing said inputted image information into partial areas, an initial noticing probability calculating device for calculating an initial noticing probability every partial area recognized by the partial area recognizing device, a sight line inducing direction calculating device for calculating a sight line inducing direction every partial area recognized by the partial area recognizing device, and its probability, and an output device for respectively displaying the initial noticing probability every partial area calculated by the initial noticing probability calculating device, and the sight line inducing direction every partial area and its probability calculated by said sight line inducing direction calculating device.

During operation, the image information inputted from the input device is divided every partial area such as a title, a photograph, a sentence, etc. and its position and size (layout) every partial area are recognized by the partial area recognizing device as one of the above sight line inducing information calculating device. Thereafter, the initial noticing probability every each partial area is calculated by the initial noticing probability calculating device by using a rule utilizing innate or experiential sight sense characteristics of a human being. Further, the sight line inducing direction every each partial area and its probability are calculated by the sight line inducing direction calculating device by using the same rule.

Then, the output device as one of the above sight line inducing information display device displays the initial noticing probability every the partial area, and the sight line inducing direction every partial area and its probability by using an electronic display device, such as a CRT (cathode ray tube), an LCD (liquid crystal display), etc.

Thus, the initial noticing probability every each partial area, the sight line inducing direction and its probability as an effective judging material (element) for estimating an eye flow are obtained, and can be visually displayed so as to be easily recognized by anyone. Therefore, the flow of the sight line of the observer can be precisely estimated from the arrangement of each partial area of the image information itself without performing the operation of a special device, such as an eye camera, etc., and a complicated operation as in the conventional case.

As this result, this invention can perform a support operation as one portion of design know-how or a technique in making the visual document, etc. by a normal business man having no (little) experience of design development, etc. Accordingly, it is possible to contribute to the production of the visual document of high quality.

In the exemplary sight line inducing information display device of the sight line inducing information display device can further include a sight line inducing information calculating device for calculating the flowing path of the sight line by a combination of the probabilities from the calculating results of said initial noticing probability calculating device and the sight line inducing direction calculating device together with its probability, and the output device displays the flowing path of the sight line calculated by the sight line inducing information calculating device. Thus, since the flowing path of a further concrete sight line can be calculated and displayed, the flow of the sight line of the observer can be more accurately estimated from the arrangement itself of each partial area of this image information.

In the exemplary sight line inducing information display device of the invention, the sight line inducing information display device can further include path designating means for designating sight line inducing information of only the path limited to a designated partial area. Namely, if the number of recognized partial areas is small, it is not particularly difficult to calculate the paths of all combinations and their probabilities in the sight line inducing information calculating device as in the described above. However, when the number of partial areas as an object is increased, the combinations of their paths become enormous. As this result, it is considered that the load with respect to the device is increased and the user waits for a long time until a calculating result is obtained, and the display gets confused and no precise estimate can be made.

Therefore, in the invention, the path designating device can further be arranged in addition to the construction of the invention. An arbitrary partial area is designated by this path designating device, and it is possible to calculate the sight line inducing information in which this designated partial area is limited to only a starting point or a terminal point, or a routing path. Thus, explosion (generation of an enormous combination number) of the combination is avoided and the combination number of the paths is limited. Therefore, the sight line inducing information of only a precise path can be calculated and displayed for a short time, and is clearly displayed and the precise estimate can be made.

In the exemplary sight line inducing information display device of the invention, the sight line inducing information display device described above can include that the output device displays the initial noticing probability calculated by the initial noticing probability calculating device by a numerical value, a separate color or the depth of the color every partial area. Thus, the magnitude of the initial noticing probability every partial area is clearly distinguished by only the sight sense by displaying the initial noticing probability of each partial area by a numerical value. Further, the magnitude of the initial noticing probability every partial area can be easily distinguished by displaying the initial noticing probability by a separate color or the depth of the color.

The sight line inducing information display device of the invention can be characterized in that, in the sight line inducing information display device described above, the output device displays the sight line inducing direction every partial area and its probability calculated by the sight line inducing direction calculating device by a figure and a numerical value showing the direction, or the strength of the figure showing the direction. Thus, it can be possible to visually clearly recognize the sight line inducing direction every partial area and its probability.

The sight line inducing information display device of the invention can be characterized in that, in the sight line inducing information display device described above, the output device displays the flowing path of the sight line calculated by said sight line inducing information calculating device by a figure showing the direction. Thus, it is possible to visually, easily and clearly grip the path of the sight line flowed between the respective partial areas.

The sight line inducing information display device of the invention can be characterized in that, in the sight line inducing information display device described above, the output device displays the flowing path of the sight line and its probability calculated by the sight line inducing information calculating device by combining a figure and a numerical value showing the direction, or the strength of the figure showing the direction. Thus, as well as the path of the sight line flowed between the respective partial areas, its probability can be visually, easily and clearly gripped.

The sight line inducing information display program of the invention can be characterized in that a computer functions as a sight line inducing information calculating step for calculating sight line inducing information from image information, and a sight line inducing information display step for displaying the sight line inducing information calculated by the sight line inducing information calculating means. Thus, the sight line inducing information can be obtained from only the image information, and can be clearly displayed to a user. Further, a general purpose computer system such as a personal computer, etc. are used and their functions can be realized in software. Therefore, an excellent economic property can be shown in comparison with a case in which these functions are realized by preparing separate dedicated hardware.

The sight line inducing information display program of the invention can be characterized in that, in the sight line inducing information display program described above, the sight line inducing information calculating step has a partial area recognizing step for recognizing said inputted image information by dividing said inputted image information into partial areas, and the sight line inducing information display step has an output step for displaying an initial noticing probability every the partial area. Thus, the sight line inducing information can be obtained from only the image information, and can be clearly displayed to a user. Further, a general purpose computer system, such as a personal computer, etc., can be used and their functions can be realized in software. Therefore, an excellent economic property can be shown in comparison with a case in which these functions are realized by preparing separate dedicated hardware.

The sight line inducing information display program of the invention can be characterized in that, in the sight line inducing information display program described above, the sight line inducing information calculating step has a partial area recognizing step for recognizing said inputted image information by dividing the inputted image information into partial areas, and the sight line inducing information display step has an output step for displaying a sight line inducing direction every said partial area and its probability. Thus, the sight line inducing information is obtained from only the image information, and can be clearly displayed to a user. Further, a general purpose computer system, such as a personal computer, etc., can be used and their functions can be realized in software. Therefore, an excellent economic property can be shown in comparison with a case in which these functions are realized by preparing separate dedicated hardware.

The sight line inducing information display program of the invention can be characterized in that, in the sight line inducing information display program described above, the sight line inducing information calculating step has a partial area recognizing step for recognizing said inputted image information by dividing the inputted image information into partial areas, and the sight line inducing information display step has an output step for respectively displaying an initial noticing probability every said partial area, and a sight line inducing direction every the partial area and its probability. Thus, the sight line inducing information can be obtained from only the image information, and can be clearly displayed to a user. Further, a general purpose computer system, such as a personal computer, etc., can be used and their functions can be realized in software. Therefore, an excellent economic property can be shown in comparison with a case in which these functions are realized by preparing separate dedicated hardware.

Further, the sight line inducing information display program of the invention can be characterized in that, in the sight line inducing information display program described above, the sight line inducing information calculating step generates the initial noticing probability every partial area constituting said inputted image information, or the sight line inducing path from the sight line inducing direction every partial area and its probability, and the initial noticing probability every the partial area, or the sight line inducing path generated by the sight line inducing information calculating device is displayed in the sight line inducing information display step. Thus, the sight line inducing information can be obtained from only the image information, and can be clearly displayed to a user. Further, a general purpose computer system, such as a personal computer, etc., can be used and their functions can be realized in software. Therefore, an excellent economic property can be shown in comparison with a case in which these functions are realized by preparing separate dedicated hardware.

The sight line inducing information display program of the invention can be a sight line inducing information display program for estimating and displaying the flowing path of a sight line of a user observing image information having plural partial areas arranged as a list, and characterized in that the sight line inducing information display program includes a sight line inducing direction calculating device for obtaining an initial noticing probability every said partial area, and a sight line inducing direction every the partial area and its probability, and also can include an output step for respectively displaying the initial noticing probability every partial area obtained in said initial noticing probability calculating step, and the sight line inducing direction every partial area and its probability calculated in said sight line inducing direction calculating step. Thus, the sight line inducing information can be obtained from only the image information, and can be clearly displayed to a user. Further, a general purpose computer system, such as a personal computer, etc., can be used and their functions can be realized in software. Therefore, an excellent economic property can be shown in comparison with a case in which these functions are realized by preparing separate dedicated hardware.

The sight line inducing information display program of the invention is a sight line inducing information display program for estimating and displaying the flowing path of a sight line of a user observing image information having plural partial areas arranged as a list, and characterized in that a computer functions as an input step for inputting an image information, a partial area recognizing step for recognizing said inputted image information by dividing said inputted image information into partial areas, an initial noticing probability calculating step for calculating an initial noticing probability every partial area recognized by the partial area recognizing device, a sight line inducing direction calculating step for calculating a sight line inducing direction every partial area recognized by said partial area recognizing device, and its probability, and an output step for respectively displaying the initial noticing probability every partial area calculated in said initial noticing probability calculating step, and the sight line inducing direction every partial area and its probability calculated by the sight line inducing direction calculating device. Thus, the eye flow of the observer can be accurately estimated from the arrangement of the partial areas of the image information itself. Further, a general purpose computer system such as a personal computer, etc. are used and their functions can be realized in software. Therefore, an excellent economic property can be shown in comparison with a case in which these functions are realized by preparing separate dedicated hardware.

The sight line inducing information display program of the invention can be characterized in that, in the sight line inducing information display program described above, the sight line inducing information display program has a sight line inducing information calculating step for calculating the flowing path of the sight line by a combination of the probabilities from the calculating results of said initial noticing probability calculating step and the sight line inducing direction calculating step together with its probability, and the flowing path of the sight line calculated in said sight line inducing information calculating step is displayed in said output step. Thus, the flowing path of a further concrete sight line can be calculated and displayed. Therefore, the flow of the sight line of the observer can be more accurately estimated from the arrangement of each partial area of the image information itself.

The sight line inducing information display program of the invention can be characterized in that, in the sight line inducing information display program described above, the sight line inducing information display program further has a path designating step for designating sight line inducing information of only the path limited to a designated partial area. Thus, explosion (generation of an enormous combination number) of the combination is avoided and the combination number of the paths is limited. Therefore, the sight line inducing information of only a precise path can be calculated and displayed for a short time, and is clearly displayed and the precise estimate can be made.

The sight line inducing information display program of the invention can be characterized in that, in the sight line inducing information display program described above, the initial noticing probability calculated in said initial noticing probability calculating step is displayed in said output step by a numerical value, a separate color or the depth of the color every partial area. Thus, the magnitude of the initial noticing probability every partial area can be easily distinguished.

The sight line inducing information display program of the invention 24 is characterized in that, in the sight line inducing information display program described in any one of inventions 20 to 22, the sight line inducing direction every partial area and its probability calculated in said sight line inducing direction calculating program are displayed in said output step by a figure and a numerical value showing the direction, or the strength of the figure showing the direction. Thus, the sight line inducing direction every partial area and its probability can be visually and clearly recognized.

The sight line inducing information display program of the invention can be characterized in that, in the sight line inducing information display program described above, the flowing path of the sight line calculated in said sight line inducing information calculating step is displayed by a figure showing the direction in said output step. Thus, the path of the sight line flowed between the respective partial areas can be visually, easily and clearly gripped.

The sight line inducing information display program of the invention can be characterized in that, in the sight line inducing information display program described above, the flowing path of the sight line and its probability calculated in said sight line inducing information calculating step are displayed in said output step by combining a figure and a numerical value showing the direction, or the strength of the figure showing the direction. Thus, as well as the path of the sight line flowed between the respective partial areas, its probability can be visually, easily and clearly gripped.

The sight line inducing information display method of invention can be a sight line inducing information display method for estimating and displaying the flowing path of a sight line of a user observing image information having plural partial areas arranged as a list, and characterized in that, after said image information is divided into the partial areas and is recognized, an initial noticing probability every recognized partial area, its sight line inducing direction and its probability are respectively calculated and displayed, and the flowing path of the sight line of the user observing said image information is estimated and displayed on the basis of this display. Thus, the initial noticing probability every partial area, the sight line inducing direction and its probability can be visually displayed so as to be easily recognized by anyone. Therefore, the flow of the sight line of the observer can be precisely estimated and displayed from the arrangement itself of each partial area of the image information without performing the operation of a special device, such as an eye camera, etc., and a complicated operation as in the conventional case.

The sight line inducing information display method of the invention can be a sight line inducing information display method for estimating and displaying the flowing path of a sight line of a user observing image information having plural partial areas arranged as a list, and characterized in that, after said image information is divided into the partial areas and is recognized, an initial noticing probability every recognized partial area, its sight line inducing direction and its probability are respectively calculated, and the flowing path of the sight line is calculated together with its probability from these calculating results by a combination of the probabilities, and the flowing path of the sight line of the user observing this image information is estimated and displayed on the basis of this display.

Namely, in the invention method, no eye flow of the user is estimated from the initial noticing probability, its sight line inducing direction and its probability, but the flowing path of the sight line is further calculated from these calculating results together with its probability. The eye flow of the user is estimated and displayed from this calculating result. Thus, the flow of the sight line of the observer is further accurately estimated and its result can be displayed to the user.

The sight line inducing information display method of the invention can be characterized in that, in the sight line inducing information display method described above, the flowing path of the sight line of said user is calculated by limiting the paths to a path going via a designated partial area. Thus, explosion of the combination is avoided and the combination number of the paths is limited. Therefore, the sight line inducing information of only a precise path can be calculated and displayed for a short time, and is clearly displayed and the precise estimate can be made.

The sight line inducing information display method of the invention can be characterized in that said partial area is sequentially designated from a large initial noticing probability in the sight line inducing information display method described above. Thus, the sight line inducing information of the path easily designated can be precisely calculated for a short time.

The sight line inducing information display method of the invention can be characterized in that the flowing path of the sight line of said user is calculated with a designated partial area as a starting point or a terminal point in the sight line inducing information display method described above. Thus, the combination of paths set to a display candidate is limited by designating the partial area as a starting point or a terminal point in advance. Therefore, the sight line inducing information of the path with this partial area as a starting point or a terminal point can be calculated for a short time.

The sight line inducing information display method of the invention can be characterized in that a largest initial noticing probability is designated in the partial area as the starting point of said path calculation in the sight line inducing information display method described above. Thus, the sight line inducing information of a further precise path can be calculated.

The sight line inducing information display method of the invention can be a sight line inducing information display method using a computer so as to estimate and display the flowing path of a sight line of a user observing image information having plural partial areas arranged as a list, and characterized in that, after said computer recognizes said image information by dividing said image information into the partial areas, an initial noticing probability every recognized partial area, its sight line inducing direction and its probability are respectively calculated and displayed, and the flowing path of the sight line of the user observing said image information is estimated and displayed on the basis of this display. Thus, the initial noticing probability every each partial area, the sight line inducing direction and its probability can be visually displayed so as to be easily recognized by anyone. Therefore, the flow of the sight line of the observer can be precisely estimated and displayed from the arrangement itself of each partial area of the image information without performing the operation of a special device such as an eye camera, etc. and a complicated operation as in the conventional case.

The sight line inducing information display method of the invention can be a sight line inducing information display method using a computer so as to estimate and display the flowing path of a sight line of a user observing image information having plural partial areas arranged as a list, and characterized in that, after said computer recognizes said image information by dividing said image information into the partial areas, an initial noticing probability every recognized partial area, its sight line inducing direction and its probability are respectively calculated, and the flowing path of the sight line is calculated together with its probability from these calculating results by a combination of the probabilities, and the flowing path of the sight line of the user observing this image information is estimated and displayed on the basis of this display. Thus, the flow of the sight line of the observer is further accurately estimated and its result can be displayed to the user.

The sight line inducing information display method of the invention can be characterized in that the flowing path of the sight line of said user is calculated by limiting the paths to a path going via a designated partial area by said computer in the sight line inducing information display method described above. Thus, explosion of the combination is avoided and the combination number of the paths is limited. Therefore, the sight line inducing information of only a precise path can be calculated and displayed for a short time, and is clearly displayed and the precise estimate can be made.

The sight line inducing information display method of the invention can be characterized in that said partial area is sequentially designated from a large initial noticing probability by said computer in the sight line inducing information display method described above. Thus, the sight line inducing information of the path easily designated can be precisely calculated for a short time.

The sight line inducing information display method of the invention can be characterized in that the flowing path of the sight line of said user is calculated with a designated partial area as a starting point or a terminal point by said computer in the sight line inducing information display method described above. Thus, similarly to the invention 13, the combination of paths set to a display candidate is limited by designating the partial area as a starting point or a terminal point in advance.

Therefore, the sight line inducing information of the path with this partial area as a starting point or a terminal point can be calculated for a short time.

The sight line inducing information display method of the invention 38 is characterized in that said computer designates a largest initial noticing probability in the partial area as the starting point of said path calculation in the sight line inducing information display method described above. Thus, the sight line inducing information of a further precise path can be calculated.

BRIEF DESCRIPTION OF THE DRAWINGS

The invention will be described with reference to the accompanying drawings, wherein like numerals reference like elements, and wherein:

FIG. 10 is a view showing the typical point every partial area and the path connecting these typical points to each other;

DETAILED DESCRIPTION OF PREFERRED EMBODIMENTS

Best modes for carrying out the invention will next be described in detail with reference to the accompanying drawings.

Figure 1:
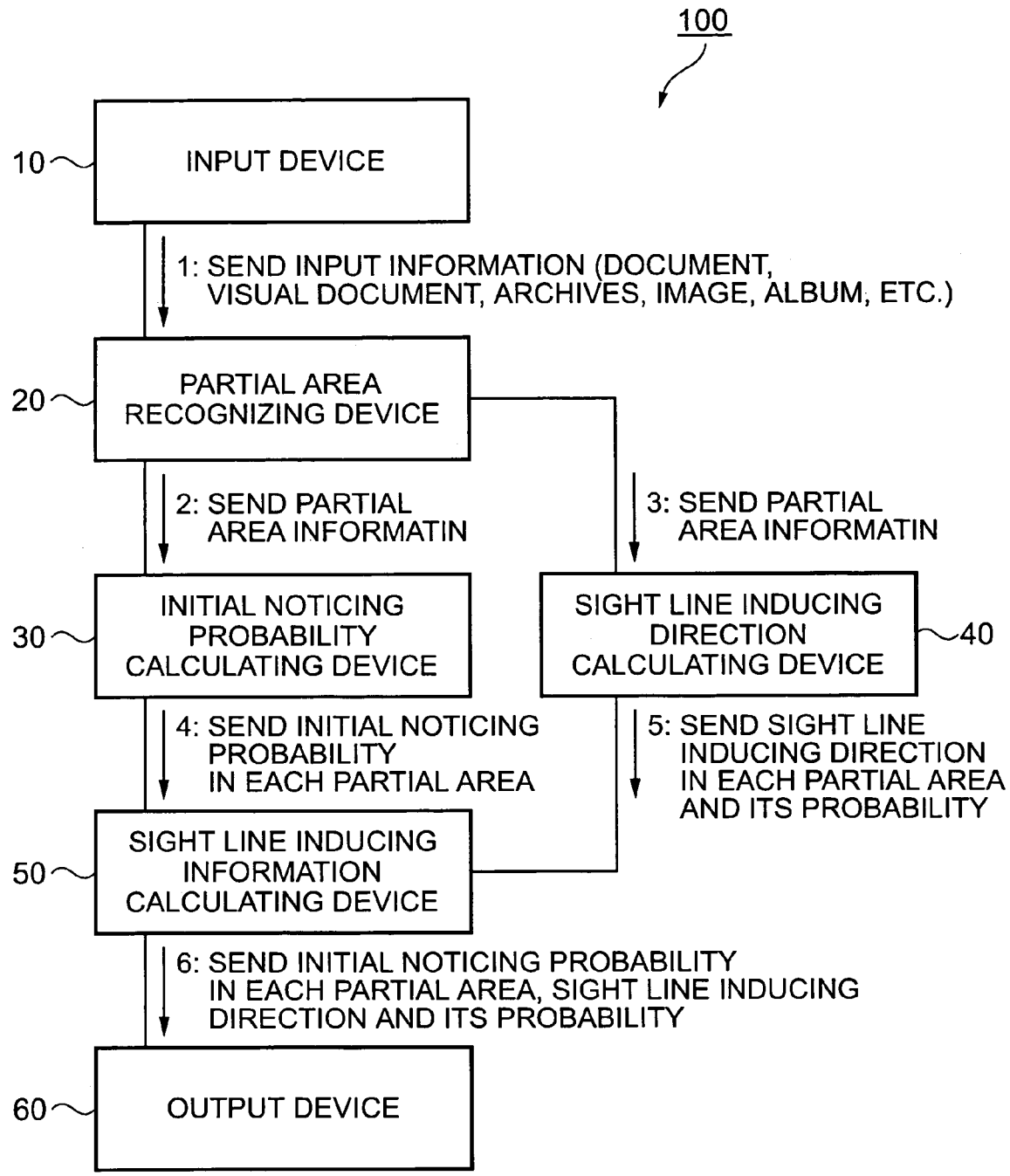
FIG. 1 is a view showing one embodiment mode of a sight line inducing information display device in the invention.

FIG. 1 shows one embodiment mode of the construction and the operation of a sight line inducing information display device 100 in the present invention. As shown in this figure, this sight line inducing information display device 100 is mainly constructed by an input device 10, a partial area recognizing device 20, an initial noticing (attention-catching) probability calculating device 30, a sight line inducing direction calculating device 40, a sight line inducing information calculating device 50 and an output device 60.

First, the input device 10 shows a function for fetching a visual document in which image information able to be recognized by the visual sense of a user, e.g., plural partial areas (document parts) such as a title, a photograph, a sentence, an illustration, etc. are arranged as a list on one layout face (screen), etc. The input device 10 also shows a function for providing this visual document to the partial area recognizing device 20 described next as input information. For example, the input device 10 is constructed by using a publicly known input device, such as an image scanner, a keyboard, a mouse, an OCR (Optical Character Reader), a digitizer, etc., and an input device using data communication such as upload, download, etc. through a network.

This input device 10 can include a case for optically reading and recognizing an existing document by a scanner, etc. and also includes a case for inputting the document in a state having layout information and a structural meaning as in XML (Extensible Markup Language).

The partial area recognizing device 20 can provide a function for dividing the visual document inputted from the input device 10 in this way into partial areas, and recognizing the position and the size every partial area.

Figures 2A, 2B:
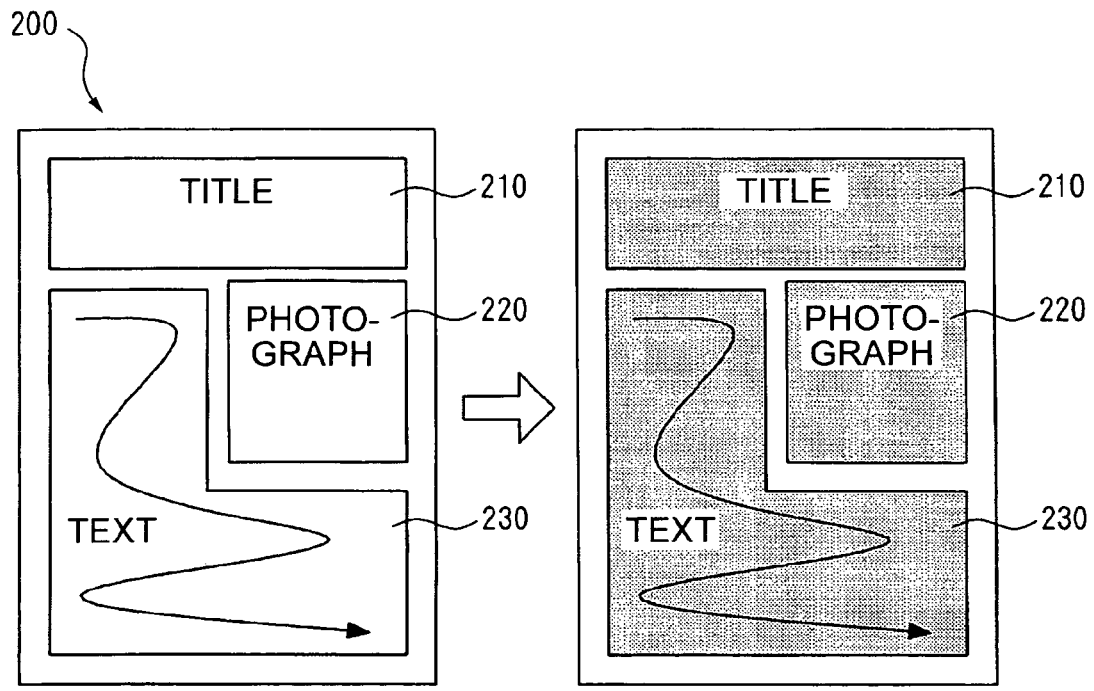
FIG. 2 is an explanatory view showing a visual document divisionally recognized by a partial area recognizing means every partial area.

For example, as shown in FIG. 2(a), the visual document 200 constructed by three partial areas of "title", "photograph" and "text" is respectively divided into a partial area 210 constructed by "title", a partial area 220 constructed by "photograph", and a partial area 230 constructed by "text". Thereafter, as shown in FIG. 2(b), etc., the partial areas are colored, etc. every each of the partial areas 210, 220, 230 so as to be easily visually recognized.

Figures 3A, 3B:
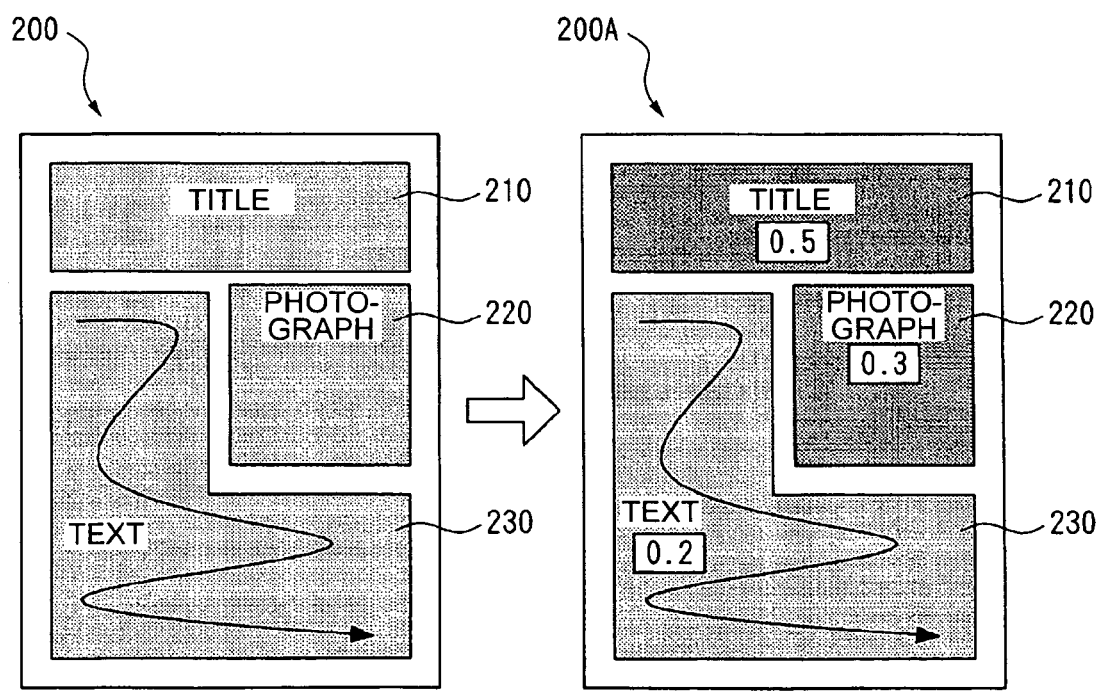
FIG. 3 is an explanatory view showing a visual document in which an initial noticing probability calculated by an initial noticing probability calculating means every partial area is displayed.

The initial noticing probability calculating device 30 can provide a function for calculating the initial noticing probability every partial area recognized by this partial area recognizing device 20. For example, as shown in FIG. 3, when a certain visual document 200 is constructed by the three partial areas 210, 220, 230 of "title", "photograph" and "text", the initial noticing probability calculating device 30 calculates this initial noticing probability every partial area 210, 220, 230, and displays the initial noticing probability within each of the partial areas 210, 220, 230. In the example of FIG. 3(b), the initial noticing probability of the partial area 210 constructed by "title" is set to "0.5". The initial noticing probability of the partial area 220 constructed by "photograph" is set to "0.3". The initial noticing probability of the partial area 230 constructed by "text" is set to "0.2". The total of the initial noticing probabilities of the respective partial areas 210, 220, 230 is set to "1.0".

Figures 4A, 4B:
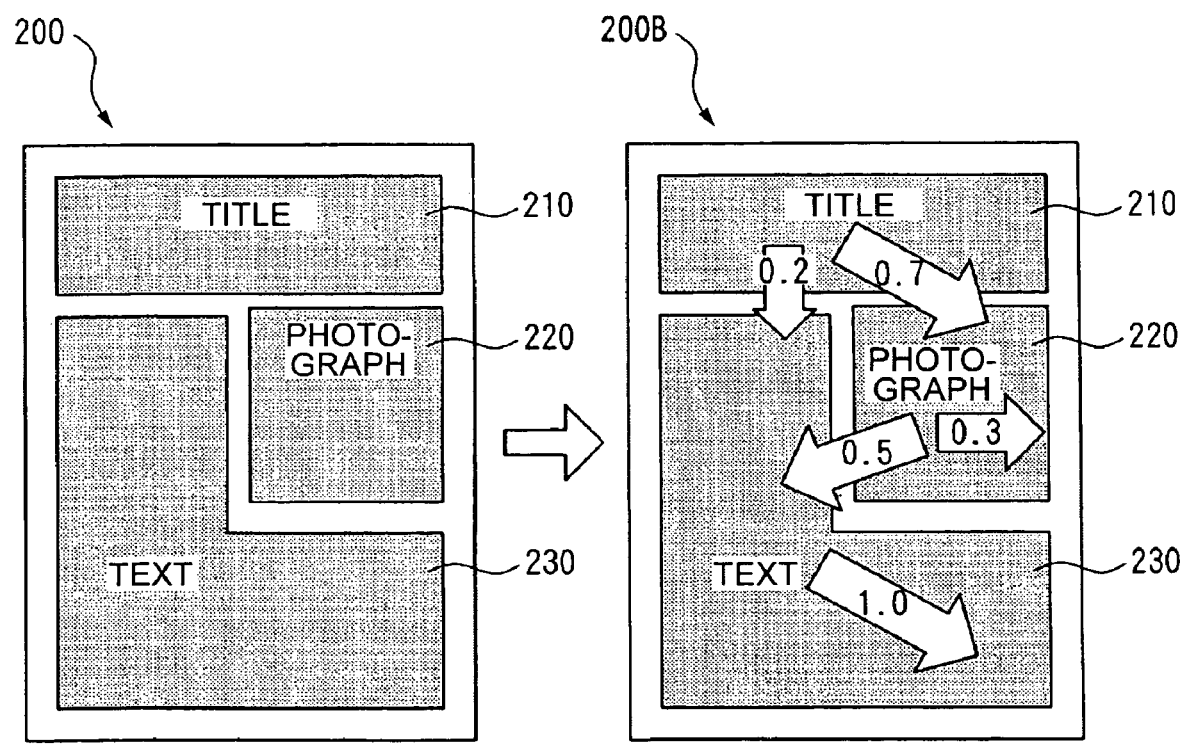
FIG. 4 is an explanatory view showing a visual document in which a sight line inducing direction calculated by a sight line inducing direction calculating means every partial area and its probability are displayed.

In contrast to this, the sight line inducing direction calculating device 40 can provide a function for calculating the sight line inducing direction every partial area recognized by the above partial area recognizing means 20 and its probability separately from the initial noticing probability obtained by this initial noticing probability calculating means 30. For example, as shown in FIG. 4, when a certain visual document 200 is constructed by the three partial areas 210, 220, 230 of "title", "photograph" and "text", the sight line inducing direction calculating means 40 calculates the induced (flowing) direction of the sight line of an observer from this partial area to another partial area every partial area 210, 220, 230, and its probability. The sight line inducing direction calculating device 40 then displays the induced direction and its probability within each of the partial areas 210, 220, 230. In the example of FIG. 4(b), when the partial area 210 constructed by "title" is noticed, the inducing direction of the sight line from this partial area 210 is constructed almost (90%) by two combinations of the partial area 220 constructed by "photograph" and the partial area 230 constructed by "test". Further, the inducing probabilities of the respective sight lines from this partial area 210 to the partial areas 220 and 230 are set to "0.7" and "0.2". Further, when the partial area 220 constructed by "photograph" is noticed, two combinations of the partial area 230 constructed by "text" and the exterior of the display face occupy 80% of the entire inducing direction of the sight line from this partial area 220. Further, the inducing probabilities of the respective sight lines from the partial area 220 to the partial area 230 and the exterior of the display face are set to "0.5" and "0.3". Further, when the partial area 230 constructed by "text" is noticed, the flowing direction of the sight line within this partial area 230 is almost constructed by the flow from the leftward upward direction to the rightward downward direction (100% ("1.0") in the example of FIG. 4(b)).

On the other hand, the sight line inducing information calculating device 50 provides a function for calculating a flowing path of the sight line together with its probability by combining the initial noticing probability every partial area obtained by the above initial noticing probability calculating device 30, and the sight line inducing direction every partial area calculated by the above sight line inducing direction calculating device 40, and its probability. For example, as shown in FIG. 5, the sight line inducing information calculating device 50 calculates the flowing path of the sight line together with its probability from a visual document 200A displaying the initial noticing probability every partial area 210, 220, 230 and a visual document 200B displaying the sight line inducing direction every partial area 210, 220, 230 and its probability. The sight line inducing information calculating means 50 then makes and displays a visual document C displaying these calculated results.

The output device 60 can provide a function for clearly displaying the flowing path of the sight line calculated by this sight line inducing information calculating device 50, and also clearly displaying each partial area divisionally recognized by the above partial area recognizing device 20, the initial noticing probability every partial area calculated by the above initial noticing probability calculating means 30, and the sight line inducing direction every partial area calculated by the above sight line inducing direction calculating device 40 and its probability. For example, this function is realized by utilizing a publicly known output device such as a display of a CRT (Cathode Ray Tube), a liquid crystal panel, a plasma panel, etc., a projector, a touch panel display, a printer such as a laser printer, an ink jet type printer, etc., a plotter, etc.

The input device 10, the partial area recognizing device 20, the initial noticing probability calculating device 30, the sight line inducing direction calculating device 40, the sight line inducing information calculating device 50 and the output device 60 constituting this sight line inducing information display device 100 can be realized by hardware by manufacturing respective dedicated devices. However, these devices can be also realized by software using a general purpose computer system such as a personal computer, etc. having all the respective functions of input, control, calculations, memory, output, etc. in advance. If this latter method is used, the respective functions can be realized more easily and economically.

Figure 6:
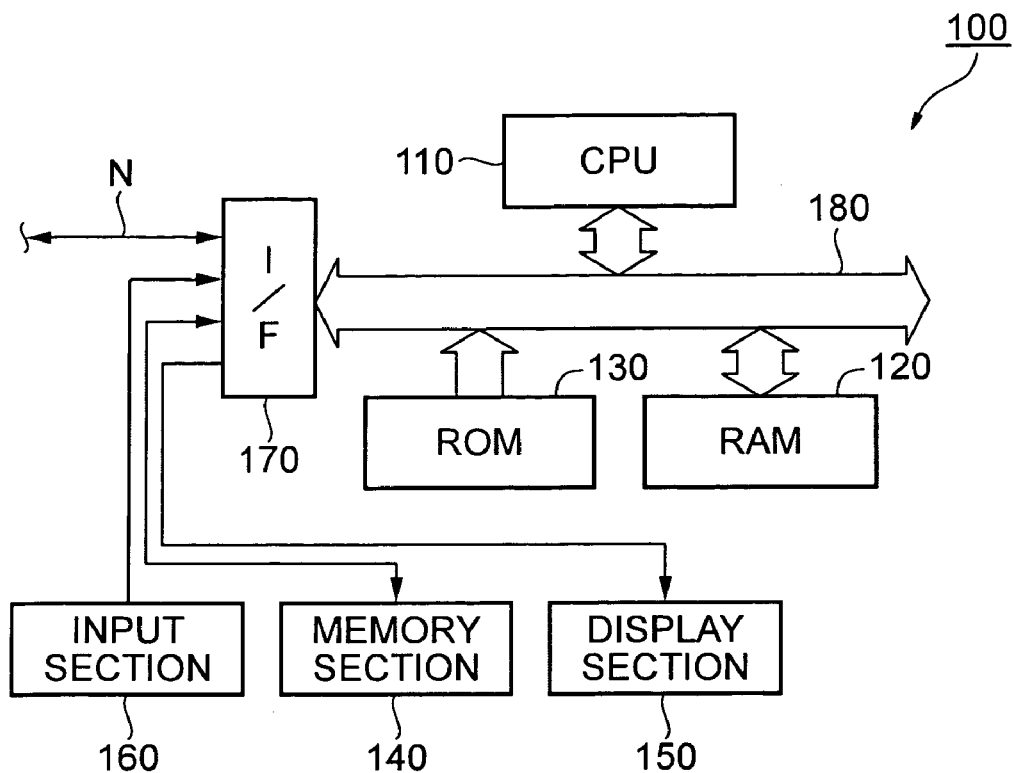
FIG. 6 is a block diagram showing the construction of hardware for realizing the sight line inducing information display device in the invention.

Namely, as shown in FIG. 6, the hardware for realizing this sight line inducing information display device 100 is constructed by bus connection using various kinds of inside-outside buses 180 such as a processor bus constructed by a PCI (Peripheral Component Interconnect) bus, an ISA (Industrial Standard Architecture) bus, etc., a memory bus, a system bus, an input-output bus, etc. between a CPU (Central Processing Unit) 110 as a central arithmetic processor for performing various kinds of controls and arithmetic processing, a RAM (Random Access Memory) 120 constituting a main memory device (Main Storage), a ROM (Read Only Memory) 130 as a memory device for only reading, an auxiliary memory section (Secondary Storage) 140 such as a hard disk drive unit (HDD), a semiconductor memory, etc., a display section 150 constructed by a monitor (LCD (liquid crystal display) and CRT (cathode ray tube)), etc., an input section 160 constructed by an image scanner, a keyboard, a mouse, etc., a communication network N of LAN, the Internet, etc., and these input-output interface (I/F) 170, etc.

For example, various kinds of dedicated computer programs stored to a memory medium, such as a CD-ROM, a DVD-ROM, a flexible disk (FD), etc., or stored to the memory section 140 through the communication network N such as the Internet, etc. or various kinds of dedicated computer programs stored to the ROM 130 in advance are loaded to the main memory device (RAM) 130. In accordance with this program loaded to this main memory device (RAM) 130, the CPU 110 performs predetermined control and the arithmetic processing by using various kinds of resources, and outputs and displays its processing results in the display section 150 through the bus 180. Further, the CPU 110 memorizes and stores data relating to its output results, etc. to the memory section 140 in accordance with necessity.

The operation and effect of the sight line inducing information display device 100 of the present invention constructed in this way will next be explained.

First, as shown in FIG. 2(a), when the visual document as an estimating object of the sight line inducing direction is a visual document 200 constructed by a printed matter in which "title", "photograph" and "text" are printed on a sheet of printing paper, the image of this visual document 200 is fetched by the input means 10 such as an image scanner, etc. as shown in FIG. 1. This image information is then sent to the partial area recognizing device 20.

Here, this visual document 200 can be obtained by the input means 10 such as an image scanner, etc., and can be also made in a computer such as a personal computer, etc., and a computer (RAM 34, etc.) using dedicated application software. In this case, electronic data constituting the visual document 200 of this computer are sent to the partial area recognizing device 20 of another computer as an object as they are, or through the network N such as LAN, etc.

Next, as shown in FIG. 2(b), the partial area recognizing device 20 receiving this image information divides this visual document 200 into three partial areas 210, 220, 230 every portion of "title", "photograph" and "text". Thereafter, as shown in FIG. 1, information relating to these partial areas 210, 220, 230 are respectively sent to the initial noticing probability calculating device 30 and the sight line inducing direction calculating device 40.

If coloring processing, etc. are performed every partial area 210, 220, 230 simultaneously with the division in the division of the partial areas 210, 220, 230 in this partial area recognizing device 20, it is possible to easily recognize at a glance whether each of the partial areas 210, 220, 230 in this partial area recognizing means 20 is correctly divided or not. If each of the partial areas 210, 220, 230 is incorrectly divided, for example, when the portions of "title" and "text" are divided as one partial area, etc., an operator, etc. for operating the invention device 10 can immediately correct the erroneous dividing range at this erroneous dividing time point.

Further, if the entire data are constructed by image data in the method for recognizing the partial area in this way, the image data are divided into each partial area and can be recognized by a publicly known image processing technique of pattern recognition, etc. Further, in an object inputted in a state having attribute information of <title>, <text, etc.>, e.g., in the case of a structured document, etc. such as HTML (HyperText Markup Language) for prescribing the attribute information by a tag, XML (Extensile Markup Language), XHTML (Extensile HyperText Markup Language), etc., no special pattern recognizing technique is required and the divisional recognition can be easily performed every partial area.

Next, as shown in FIG. 1, one initial noticing probability calculating means 30 receiving the partial area information from this partial area recognizing means 20 calculates the initial noticing probabilities every partial area 210, 220, 230 recognized by this partial area recognizing device 20, and sends their calculated results to the sight line inducing information calculating device 50.

For example, in the example of FIG. 3, the initial noticing probability of the partial area 210 corresponding to "title" is calculated as "0.5". The initial noticing probability of the partial area 220 corresponding to "photograph" is calculated as "0.3". The initial noticing probability of the partial area 230 corresponding to "text" is calculated as "0.2". The respective numerical values of the noticing probabilities are reduced in the order of "title">"photograph">"text".

If the degree of this initial noticing probability is not represented necessarily by only the numerical values as mentioned above, but is also represented by the kind of a color and the depth of the color corresponding to this probability, e.g., if the coloring is deeply performed and the coloring of a warm color system is performed, etc. in the representation as the initial noticing probability is raised, the degree of the initial noticing probability every partial area can be more clearly gripped.

Further, the calculating method of the initial noticing probability every partial area using this initial noticing probability calculating means 30 is not particularly limited. For example, a publicly known technique for calculating the noticing degree of a "eye-catching degree", etc. can be utilized as this calculating method.

Namely, this "eye-catching degree" is a parameter conformed to the subjective taste of a human being. For example, its calculating method is disclosed in detail in "JP-A-2001-126070 (an attention-catching area extracting device and an automatic composition determining device using this attention-catching area extracting device)", etc. This calculating method will next be schematically explained briefly.

The eye-catching degree is evaluated in accordance with the physical characteristics of an original image to calculate the attention-catching area.

In the calculation of the attention-catching area, a most eye-catching area is extracted from the evaluating result as the attention-catching area. Namely, since the attention-catching area evaluation is performed in conformity with the subjective taste of the human being in accordance with the physical characteristic, attention-catching areas adapted for the subjective taste of the human being can be extracted.

For example, when the physical characteristics include heterogeneous degree of color, the eye-catching degree can be evaluated on the basis of the difference in color of each area. Further, in addition to the heterogeneous degree of color, the physical characteristics include heterogeneous degree of shape, heterogeneous degree of area and heterogeneous degree of texture (pattern). Accordingly, if the eye-catching degree is evaluated on the basis of at least one of these four heterogeneous degrees, the eye-catching degree can be precisely evaluated in accordance with the characteristics of the original image. Further, if the three elements (hue, chroma, brightness) of color are also evaluated, an area close to a conspicuous color (red color) to the subjective taste of human being can be evaluated as a most eye-catching area. Further, if a spatial frequency and the area of each region in the original image are also evaluated, the evaluation of the most eye-catching area can be further precisely judged.

This eye-catching degree can be evaluated by the following procedure.

(1) First, the original image as an object is divided into areas. In this case, the original image is divided into a figure area and a picture area. As a method of such division, a boundary detecting method based on "edgeflow" described in "EdgeFlow: A framework of Boundary Detection and Image Segmentation" of W. Y. Ma, B. S. Manjunath, et al. in IEEE in 1997 is applied.

(2) Next, the figure area divided in this way is extracted and the "eye-catching degree" of this area is evaluated.

This eye-catching degree is schematically evaluated as follows.

(a) A heterogeneous eye-catching degree of each area is first calculated. In this case, the heterogeneous degrees of color, texture, shape and area are respectively calculated, and weight coefficients are given to these respective heterogeneous degrees and are linearly connected so as to obtain the heterogeneous eye-catching degree of each area. (b) A characteristic eye-catching degree in each area is next calculated. In this case, the eye-catching degrees of the color, spatial frequency and area are calculated, and weight coefficients are respectively given to these eye-catching degrees and are linearly connected so that the characteristic eye-catching degree of each area is calculated. (c) Finally, the heterogeneous eye-catching degree and the characteristic eye-catching degree are added to each other for each area to obtain a characteristic amount integrating value. This characteristic amount integrating value is evaluated by a predetermined beta function and the eye-catching degree of a target object is calculated.

On the other hand, as shown in FIG. 1, the sight line inducing direction calculating device 40 which receives information relating to the partial area similarly from the partial area recognizing device 20 calculates the sight line inducing direction and its probability every each partial area recognized by the partial area recognizing device 20, and similarly sends its calculating results to the sight line inducing information calculating device 50.

In the example of FIG. 4, three sight line inducing directions are supposed from the partial area 210 corresponding to "title" to another area that is, a partial area 220 corresponding to "photograph", a partial area 230 corresponding to "text", and others (area exterior). It is shown that these probabilities are respectively "0.7", "0.2" and "0.1". Further, similarly, three sight line inducing directions from the partial area 220 corresponding to "photograph" to another area are considered, that is, to the partial area 230 corresponding to "text", to the area exterior and others sight line. It is shown that these probabilities are "0.5", "0.3" and "0.2. Further, it is similarly shown that the inducing direction of the sight line within the partial area 230 corresponding to "text" is generally the rightward downward direction in many cases, and the probability of this direction is "1.0" in the example of FIG. 4, i.e., only this direction exists.

This sight line inducing direction and its probability for every partial area, may be indicated not only by simply using an arrow and a numerical value, but may be also displayed by indicating the largeness and smallness of its probability with the thickness of the arrow as shown in FIG. 4.

Further, the probability of this sight line inducing direction just shows the correlation (large and small relation) with the probability of another sight line inducing direction. Accordingly, it is not necessary that the total of its probabilities is "1.0", and this total may be also set to "1.0" or less and "1.0" or more.

Further, it can be also considered that this arrow is a vector relating to the sight line induction using the thickness instead of the length.

Here, no calculating rule as a reference in this sight line inducing direction calculating means 40 is particularly limited. However, it is considered that there are many cases using a rule derived from each characteristics known as sight line dynamic characteristics of the human being, e.g., publicly known characteristics as shown below, etc.

i. The sight line is flowed along a mark for inducing the sight line such as an arrow, etc.

ii. The sight line is flowed to the tip of a sharp object.

iii. The sight line is flowed to the direction of an eye line of a photographed person.

Figure 7:
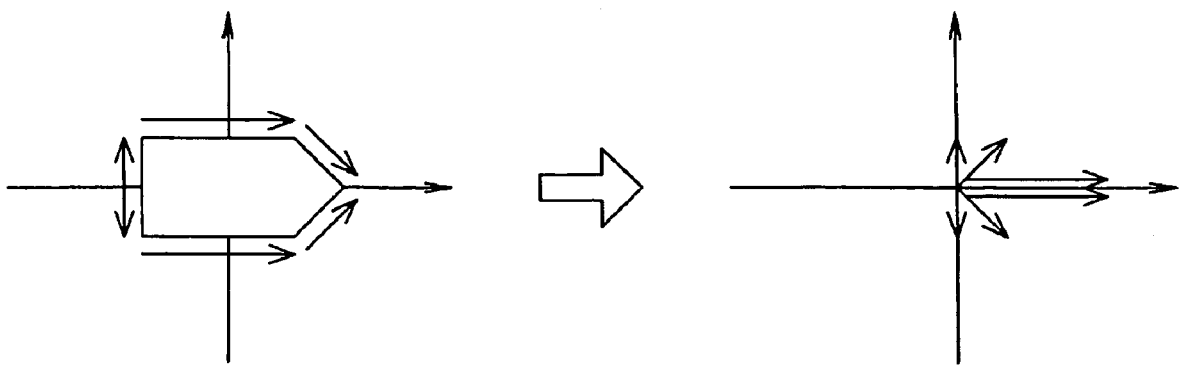
FIG. 7 is an explanatory view for decomposing an arrow into edge components and displaying its histogram.

As shown in FIG. 7, a method able to decompose such an arrow and the tip of the sharp object into edge components and make its histogram and calculate the inducing direction of the sight line on the basis of this histogram can be also utilized to recognize such an arrow and the tip of the sharp object.

Next, as shown in FIG. 1, the sight line inducing information calculating device 50 respectively receives the initial noticing probabilities in the respective partial areas 210, 220, 230 from the initial noticing probability calculating device 30 in this way, and also receives the sight line inducing directions in the respective partial areas 210, 220, 230 from the sight line inducing direction calculating device 40 and their probabilities. The sight line inducing information calculating device 50 then calculates both the flowing path of the sight line and its probability by combining the initial noticing probability every partial area 210, 220, 230 and the sight line inducing direction every partial area 210, 220, 230 and its probability. The sight line inducing information calculating device 50 further sends their calculating results to the output device 60.

Figures 5A, 5B:
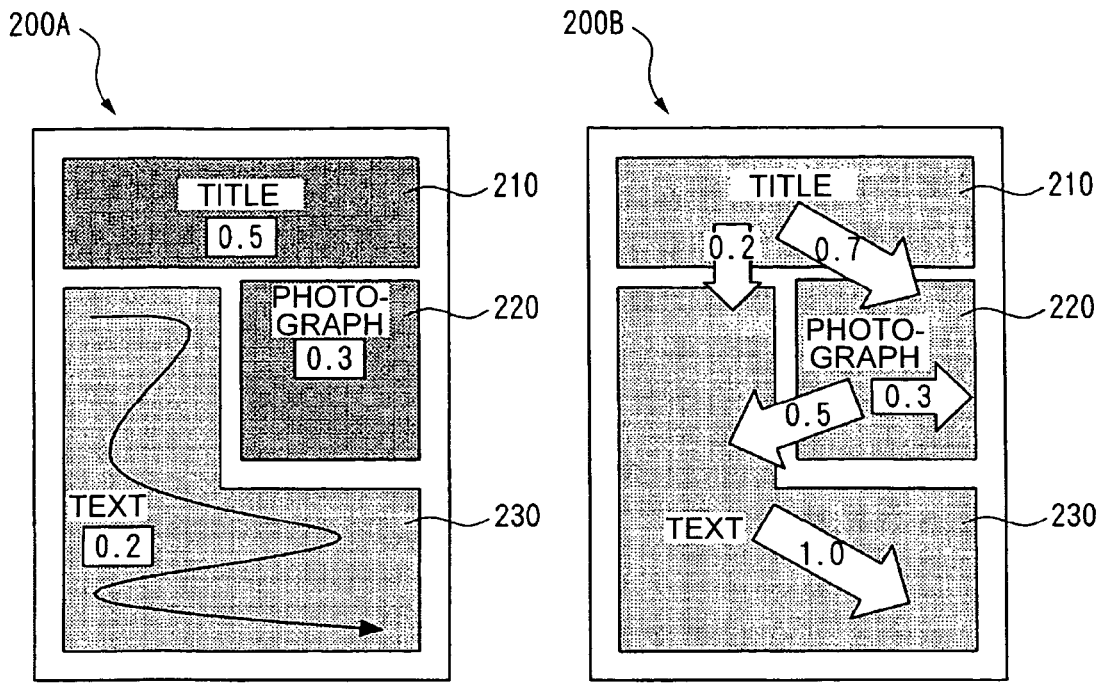
FIG. 5 is an explanatory view showing a visual document in which the flowing path of a sight line calculated by a sight line inducing information calculating means and its probability are displayed.
Figure 5C:
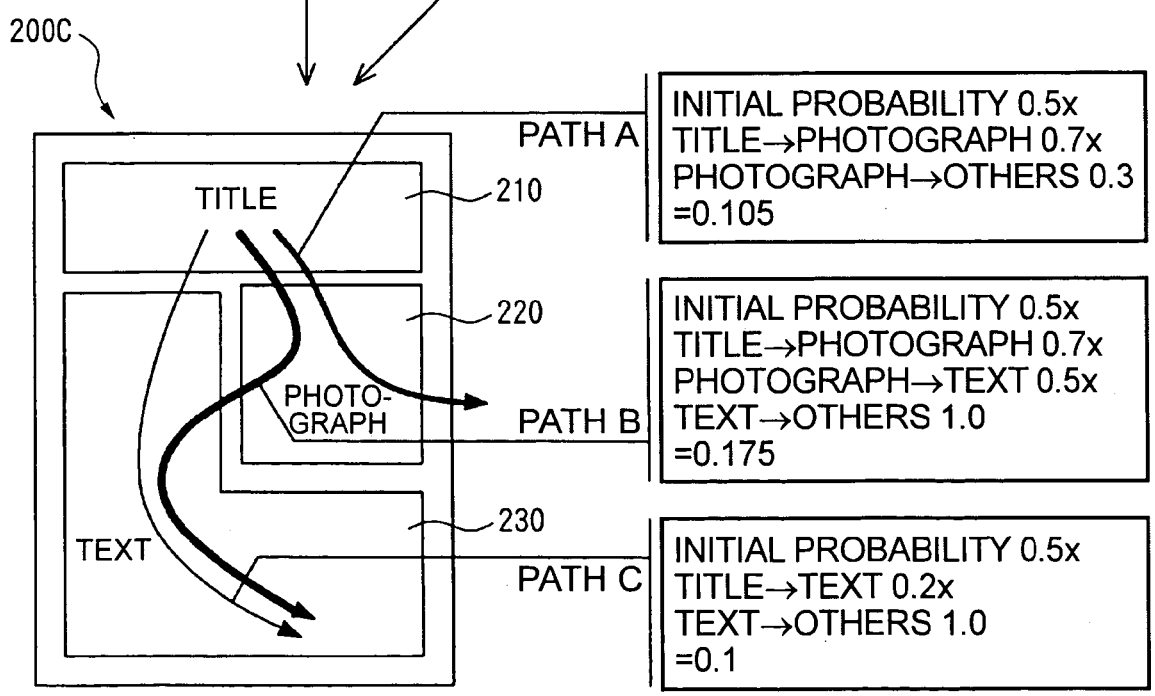
Figure 8:
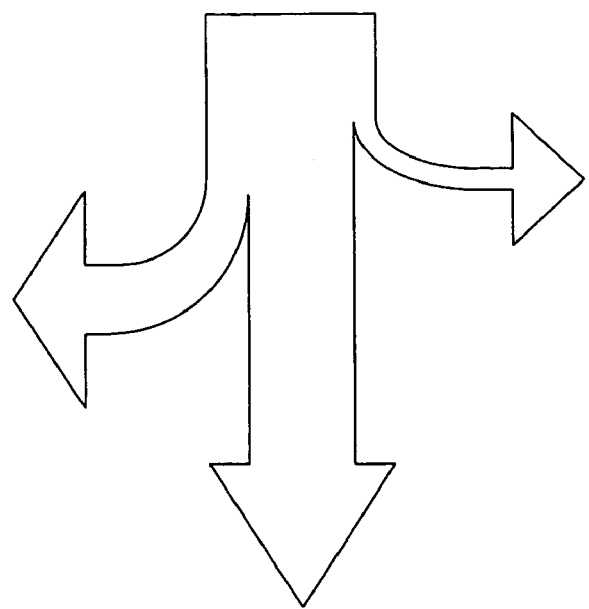
FIG. 8 is a conceptual view visually showing the direction and probability of the flowing path of the sight line.

In the example of FIG. 5(c), three combinations of a "path A" (a path flowing from the partial area 210 to the partial area 220 and then flowing out to the area exterior), a "path B" (a path flowing from the partial area 210 to the partial area 220 and then moving to the partial area 230 and flowing in the rightward downward direction in this partial area 230), and a "path C" (a path directly flowing from the partial area 210 to the partial area 230 side) with the partial area 210 corresponding to "title" highest in the initial noticing probability as a starting point are calculated from the visual document 200A and the visual document 200B. As shown in FIG. 5(a), the visual document 200A is divided and colored every partial area 210, 220, 230. As shown in FIG. 5(b), the visual document 200B displays the sight line inducing direction every partial area 210, 220, 230 and its probability. Further, this probability is calculated with respect to each of the "paths A, B, C", and the thickness of an arrow (line) showing the path is respectively changed and displayed in accordance with this probability as shown in FIG. 8.

Namely, as shown in FIG. 5(c), the probability for flowing the sight line along the "path A" becomes "0.105" obtained by multiplying "0.5" as the initial noticing probability of the partial area 210 by "0.7" as the probability for flowing the sight line from the partial area 210 to the partial area 220, and "0.3" as the probability for flowing-out the sight line from the partial area 220 to the area exterior.

Further, the probability for flowing the sight line along the "path B" becomes "0.175" obtained by multiplying "0.5" as the initial noticing probability of the partial area 210 by "0.7" as the probability for flowing the sight line from the partial area 210 to the partial area 220, "0.5" as the probability for moving the sight line from the partial area 220 to the partial area 230 side, and "1.0" as the probability for flowing the sight line in the rightward downward direction within the partial area 230.

Further, the probability for flowing the sight line along the "path C" becomes "0.1" obtained by multiplying "0.5" as the initial noticing probability of the partial area 210 by "0.2" as the probability for directly flowing the sight line from the partial area 210 to the partial area 230, and "1.0" as the probability for flowing the sight line in the rightward downward direction within the partial area 230.

The output device 60 receives information relating to the flowing path of the sight line and its probability from the sight line inducing information calculating device 50 in this way. The output device 60 then displays the visual document 200C showing these paths and probability in a display, or makes the visual document 200C by a printer and presents the visual document 200C to a user, etc.

In the example of FIG. 5(c), the "path B" largest in the total probability among the three combinations of the paths "A, B, C" is estimated as a most natural (large in probability) path as the flow of the sight line of an observer.

When the flows of the sight lines of plural observers seeing this visual document are actually observed by an eye camera, the flow of the sight line along the "path B" has been observed with high probability similarly to this estimated result.

In the invention, image information, such as the visual document, etc., is divided into the respective partial areas in this way, and the initial noticing probability every partial area and the sight line inducing direction every partial area and its probability are calculated. The flowing path of the sight line and its probability are displayed from these calculating results. Accordingly, this flowing path of the sight line and its probability can be visually displayed so as to be easily recognized by anyone. Thus, the flow (eye flow) of the sight line of the observer can be accurately estimated from the arrangement of document parts of this visual document itself.

As this result, it is possible to support an ordinary business man having no (little) experience of design development, etc. as one portion of design know-how or a technique in making the visual document. Accordingly, it is possible to contribute to the production of the visual document of high quality.

In the embodiment mode of FIG. 1, only the calculating result obtained by the sight line inducing information calculating device 50 is displayed by the output device 60. However, all the results obtained in the above respective device 10, 20, 30, 40, 50 may be also respectively displayed as well as this calculating result. For example, when the dividing position of the partial area divided by the partial area recognizing means 10 is incorrect as mentioned above and the incorrect partial area is adopted as it is, the subsequent calculating result is greatly different and reliability with respect to the estimate is greatly damaged. However, if this result is visually displayed at the dividing stage in this way, the error at each stage can be easily found so that the sight line inducing information can be more accurately estimated.

Further, if the result obtained at each stage in this way is displayed every time, the sight line inducing path and the probability can be easily calculated as shown by the visual document 200C from the visual document 200A displaying the initial noticing probability as shown in FIG. 3 and the visual document 200B displaying the sight line inducing direction and its probability every partial area as shown in FIG. 4 every time an operator gains experience. Accordingly, the sight line inducing information calculating means 50 itself may be omitted (bypassed) in accordance with cases.

Further, the display may be also performed by using another figure, e.g., an equilateral triangle, etc. instead of the arrow showing the inducing direction of the sight line and the path, or together with the arrow. Further, it is not necessary to continuously form a line showing the flow of the sight line as shown in FIG. 5(c), but this line may be also formed by a dot series. Further, display using a curve constructed by a Bezier curve, a spline, etc. may be also performed and plural straight lines may be also continuously connected to each other.

Figure 9A:
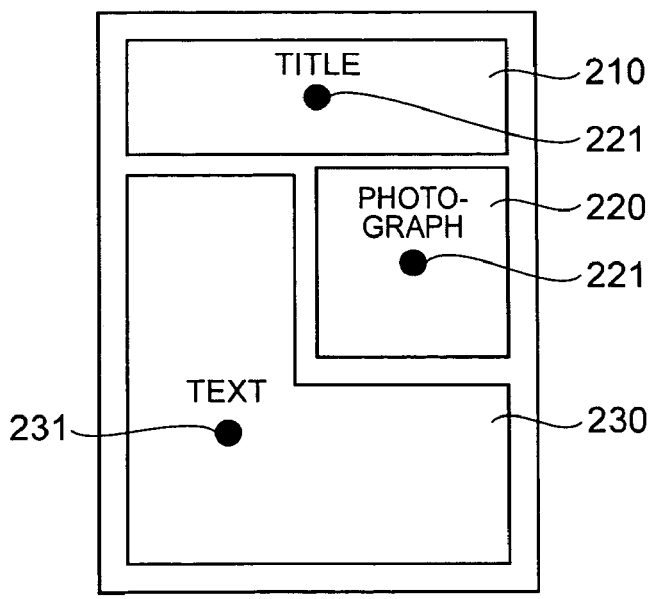
FIG. 9 is a view showing a typical point every partial area and a path connecting these typical points to each other.
Figure 9B:
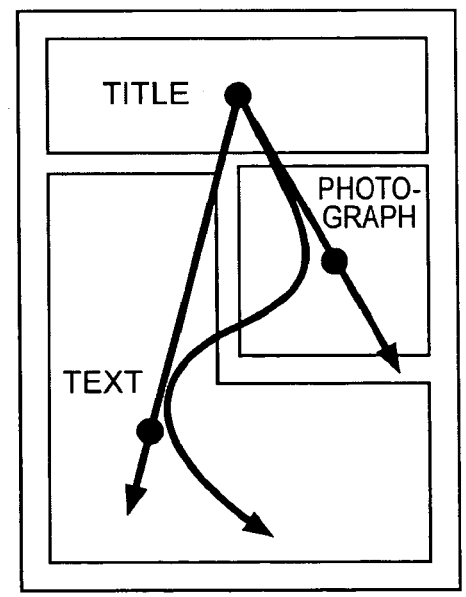

Here, a publicly known algorithm, such as a spline curve, a Bezier curve, etc. for generating the curve from plural dot series can be utilized to generate the flowing path of the sight line as shown in FIG. 5(c). For example, as shown in FIG. 9(a), points for representing the respective partial areas 210, 220, 230 are respectively set to typical points 211, 221, 231. When these typical points are simply connected to each other, the "path A" becomes a straight line connecting two points constructed by the typical points 211 and 221, as shown in FIG. 9(b). Further, the "path B" becomes a curve continuously connecting three points constructed by the typical points 211, 221 and 231. The "path C" becomes a straight line connecting two points constructed by the typical points 211 and 231. However, for example, there are a flow of sentences, etc. in the partial area 230 of "text", etc., and there is no case in which the sight line straightly passes through downward. Accordingly, it is insufficient to simply connect the typical points 211, 221, 231 of the respective partial areas 210, 220, 230 to each other in this way.

Therefore, in the invention, each sight line inducing direction every partial area 210, 220, 230 and its probability can be considered as a size and a virtual vector is set. A control point is then dotted at the tip of this vector. Thereafter, the curve is generated so as to pass through both the typical points 211, 221, 231 of the respective partial areas 210, 220, 230 and the control point of the path direction selected from the respective partial areas 210, 220, 230. Thus, it is possible to display a natural flowing path of the sight line. For example, as shown in FIG. 10(a), in the partial area 230 direction showing "text" of probability "0.2" from the typical point 211 of the partial area 210 showing "title", the virtual vector is first set at a size proportional to this probability, and a control point 213 is set at its tip. Further, in the partial area 220 direction showing "photograph" of probability "07", the virtual vector is similarly set at a size proportional to its probability, and a control point 212 is set. Further, similarly to this, in the area exterior direction of probability "0.3" from the typical point 221 of the partial area 220 showing "photograph", the virtual vector is set at a size proportional to its probability, and a control point 222 is set at its tip. Further, similarly, in the partial area 230 direction showing "text" of probability "05", the virtual vector is set at a size proportional to its probability, and a control point 223 is set. Further, similarly to this, in the rightward downward direction from the typical point 231 of the partial area 230 showing "text", the virtual vector is set at a size proportional to its probability, and a control point 232 is set at its tip.

As shown in FIG. 10(b), the "path C" as one of the natural eye flows as mentioned above can be displayed by generating a curve sequentially connecting the typical point 211, the control point 213, the typical point 232 and the control point 231. Similarly, the "path A" as one of the natural eye flows as mentioned above can be displayed by generating a curve sequentially connecting the typical point 211, the control point 212, the typical point 221 and the control point 222. Further, similarly, the "path B" as one of the natural eye flows as mentioned above can be displayed by generating a curve sequentially connecting the typical point 211, the control point 212, the typical point 221, the control point 223, the typical point 232 and the control point 231.

The recognizing results of the partial area and an object using the algorithm of a high degree may be also obtained from the exterior with respect to the partial area recognition as well as the "sight line inducing direction". With respect to the information of a lowest limit required in the sight line inducing information, it is sufficient that the entire information is divided into some portions and there is information of the initial noticing probability and the sight line inducing direction (direction and size) in these divided portions. Dividing processing, processing for calculating the initial noticing probability, and processing for calculating the sight line inducing direction are not required in the interior.

Figure 11:
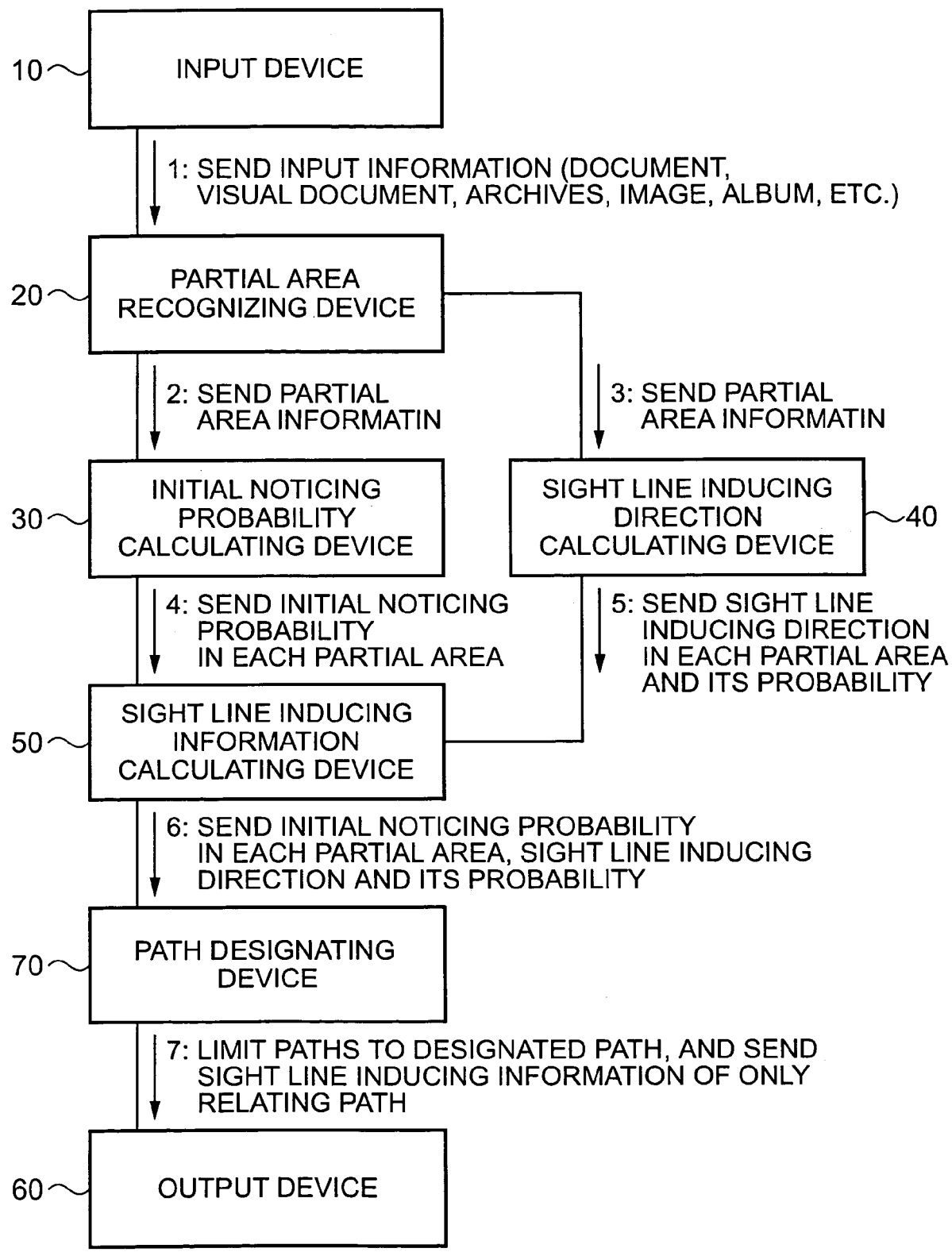
FIG. 11 is a view showing another embodiment mode of the sight line inducing information display device in the invention.
Figure 12:
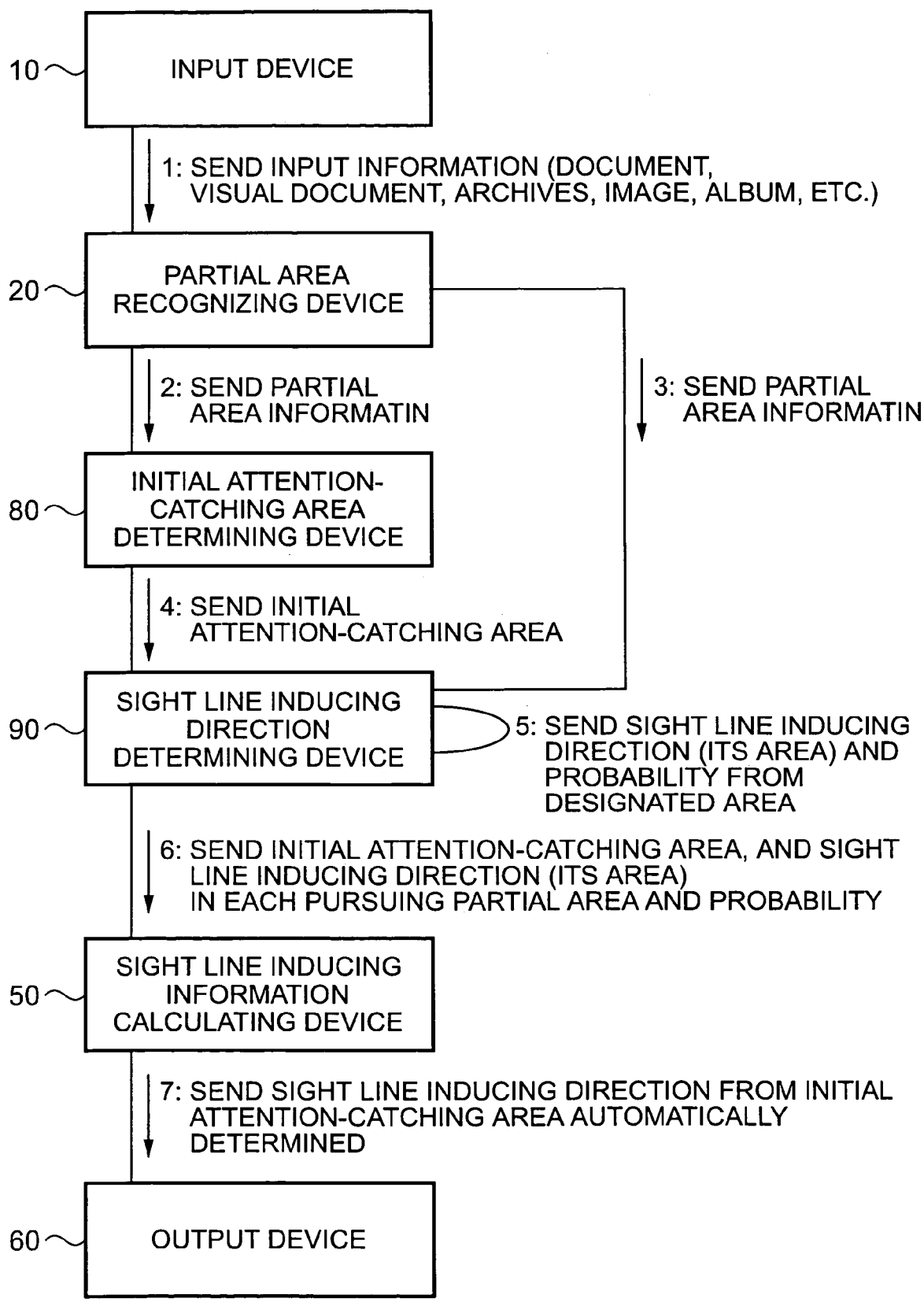
FIG. 12 is a view showing another embodiment mode of the sight line inducing information display device in the invention.
Figure 13:
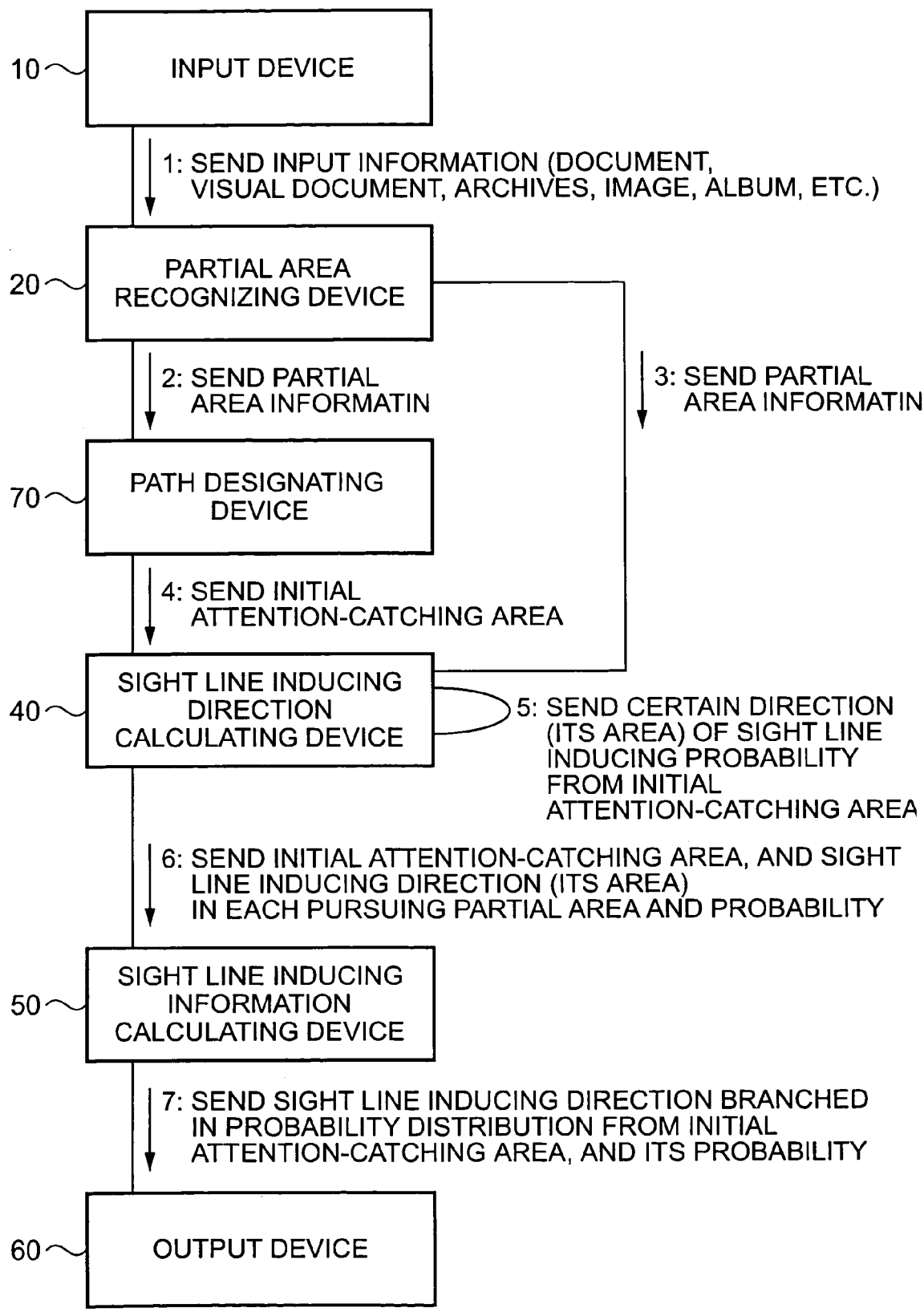
FIG. 13 is a view showing another embodiment mode of the sight line inducing information display device in the invention.

FIGS. 11 to 13 show other exemplary embodiment modes of the invention.

First, in FIG. 11, a path designating device 70 is newly arranged between the sight line inducing information calculating device 50 and the output device 60 shown in FIG. 1.

This path designating device 70 provides a function for sending this sight line inducing information to the output device 60 so as to display only a relating path by limiting the paths to a path designated by a user, etc. Thus, the path can be easily seen and an optimum path can be estimated.

Namely, if the number of partial areas is about three as in the above embodiment mode, the number of all paths is small. Even when the paths of all combinations and their probabilities are calculated and displayed, the user can precisely grip the respective paths. However, when the number of divided partial areas is further increased, it is considered that the combination of their paths is enormously increased so that the display gets confused and no precise estimate can be made.

Therefore, if the path designating device 70 for displaying only the relating path by limiting the paths to a path designated by the user, etc. is arranged as in this embodiment mode, the number of displayed paths is reduced and the paths are easily seen so that a more precise estimate can be made.

Here, for example, a designating method for limiting only the partial area desirously set to a starting point or a terminal point of the eye flow, only the partial areas desirously set to both the starting point and the terminal point, or only the partial area desirously set as a path between the starting point and the terminal point is generally considered as the designating method of the path using this path designating device 70.

Further, if this path designating device 70 is arranged on the upstream side of the sight line inducing information calculating device 50, a load in this sight line inducing information calculating device 50 is reduced and its calculating result can be rapidly sent to the output device 60 side.

Further, no concrete designating method of the partial area is particularly limited. For example, the methods that a user individually designates a specific partial area by using a pointing device such as a mouse, etc., and the device presents a list of all the partial areas and the user arbitrarily makes a selection from this list, etc. are considered.

Next, in FIG. 12, the initial noticing probability calculating device 30 and the sight line inducing direction calculating device 40 shown in FIG. 11 are disused, and an initial attention-catching area determining device 80 and a sight line inducing direction determining device 90 are newly sequentially arranged on the downstream side of the partial area recognizing device 20. The initial attention-catching area determining device 80 gives a function for narrowing-down the partial area highest in the probability to the above initial noticing probability calculating device 30. The sight line inducing direction determining device 90 gives a function for narrowing-down the partial area highest in the probability to the above sight line inducing direction calculating device 40.

Namely, in this embodiment mode, as shown in FIG. 12, the initial attention-catching area is calculated by the initial noticing probability calculating means 30. Thereafter, one partial area highest in the probability is narrowed down and is set to the initial attention-catching area. The direction for inducing the sight line from this initial attention-catching area is calculated. With respect to this direction, one direction highest in the probability is narrowed down in portions in which the sight line is branched with various probabilities in various directions.

When processing for further calculating the inducing direction of the sight line with respect to the partial area in the direction highest in the probability is repeated, it is possible to calculate a path connecting combinations of the highest probability although it is local as a result.

Namely, the above construction of FIG. 11 avoids explosion of the combination by limiting the number of excessive combinations from the exterior by the user. However, in the construction of this embodiment mode, it is not entirely an optimum solution, but one eye flow can be automatically calculated by locally connecting optimum solutions to each other.

Further, in FIG. 13, the path designating device 70 used in FIG. 11 is used instead of the initial attention-catching area determining device 80 shown in FIG. 12, and the sight line inducing direction calculating device 40 is again used instead of the sight line inducing direction determining device 90.

Namely, in the embodiment mode shown in FIG. 13, no initial attention-catching area is automatically calculated, but the initial attention-catching area (=starting spot of the calculation) can be designated by the user. Thus, for example, it is possible to make a reply with respect to a request such as "it is desirous to know how the sight line is flowed from the partial area designated by the user" so that the operation of the display device can be more softly controlled.

In particular, with respect to the difference between this embodiment mode and the construction of FIG. 1, the path to be displayed is limited before the display after all the combinations are once calculated in the construction of FIG. 11. In contrast to this, in this embodiment mode, an unnecessary calculation itself can be omitted by first designating the path.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A sight line inducing information display device that estimates and displays a flowing path of a sight line of a user observing image information having plural partial areas, the sight line inducing information display device comprising:
   a sight line inducing direction calculating device that obtains an initial noticing probability every said partial area, and a sight line inducing direction every said partial area and its probability; and
   an output device that respectively displays an initial noticing probability every partial area obtained by said initial noticing probability calculating device, and the sight line inducing direction every partial area and its probability calculated by said sight line inducing direction calculating device.

2. A sight line inducing information display device that estimates and displays a flowing path of a sight line of a user observing image information having plural partial areas, the sight line inducing information display device comprising:
   an input device that inputs said image information;
   a partial area recognizing device that recognizes said inputted image information by dividing said inputted image information into partial areas;
   an initial noticing probability calculating device that calculates an initial noticing probability every partial area recognized by the partial area recognizing device;
   a sight line inducing direction calculating device that calculates a sight line inducing direction every partial area recognized by said partial area recognizing device, and its probability; and
   an output device that respectively displays the initial noticing probability every partial area calculated by said initial noticing probability calculating device, and the sight line inducing direction every partial area and its probability calculated by said sight line inducing direction calculating device.

3. The sight line inducing information display device according to claim 2,
   the sight line inducing information display device further including a sight line inducing information calculating device that calculates a flowing path of the sight line by a combination of probabilities from the calculating results of said initial noticing probability calculating device and the sight line inducing direction calculating device together with its probability, and
   said output device displays the flowing path of the sight line calculated by said sight line inducing information calculating device.

4. The sight line inducing information display device according to claim 3,
   the sight line inducing information display device further including a path designating device that designates sight line inducing information of only the path limited to a designated partial area.

5. The sight line inducing information display device according to claim 2,
   said output device displaying the initial noticing probability calculated by said initial noticing probability calculating device by a numerical value, a separate color or a depth of color every each partial area.

6. The sight line inducing information display device according to claim 2,
   said output device displaying the sight line inducing direction every partial area and its probability calculated by said sight line inducing direction calculating device by a figure and a numerical value showing the direction, or the strength of the figure showing the direction.

7. The sight line inducing information display device according to claim 3,
   said output device displays the flowing path of the sight line calculated by said sight line inducing information calculating device by a figure showing the direction.

8. The sight line inducing information display device according to claim 3,
   said output device displays the flowing path of the sight line and its probability calculated by said sight line inducing information calculating device by combining a figure and a numerical value showing the direction, or a strength of the figure showing the direction.

9. A computer readable storage medium storing a sight line inducing information display program for estimating and displaying a flowing path of a sight line of a user observing image information having plural partial areas arranged as a list, the program causing a computer to perform:

an input step of inputting said image information;

a partial area recognizing step of recognizing said inputted image information by dividing said inputted image information into partial areas;

an initial noticing probability calculating step of calculating an initial noticing probability every partial area recognized in the partial area recognizing step;

a sight line inducing direction calculating step of calculating a sight line inducing direction every partial area recognized in said partial area recognizing step, and its probability; and an output step of respectively displaying the initial noticing probability every partial area calculated in said initial noticing probability calculating step, and the sight line inducing direction every partial area and its probability calculated in said sight line inducing direction calculating step.

10. A sight line inducing information display method for estimating and displaying a flowing path of a sight line of a user observing image information having plural partial areas arranged as a list, comprising:

after said image information is divided into the partial areas and is recognized, an initial noticing probability every recognized partial area, its sight line inducing direction and its probability are respectively calculated and displayed, and the flowing path of the sight line of the user observing said image information is estimated and displayed on the basis of this display.

11. The sight line inducing information display method according to claim 10, the flowing path of the sight line of said user being calculated by limiting the paths to a path going via a designated partial area.

12. The sight line inducing information display method according to claim 11, said partial area being sequentially designated from a large initial noticing probability.

13. The sight line inducing information display method according to claim 10, the flowing path of the sight line of said user being calculated with a designated partial area as a starting point or a terminal point.

14. The sight line inducing information display method according to claim 13, a largest initial noticing probability being designated in the partial area as a starting point of said path calculation.

15. A sight line inducing information display method for estimating and displaying a flowing path of a sight line of a user observing image information having plural partial areas arranged as a list, comprising:

after said image information is divided into the partial areas and is recognized, an initial noticing probability every recognized partial area, its sight line inducing direction and its probability are respectively calculated, and the flowing path of the sight line is calculated together with its probability from these calculating results by a combination of the probabilities, and the flowing path of the sight line of the user observing this image information is estimated and displayed on the basis of this display.

16. A sight line inducing information display method using a computer so as to estimate and display a flowing path of a sight line of a user observing image information having plural partial areas arranged as a list, comprising:

after said computer recognizes said image information by dividing said image information into the partial areas, an initial noticing probability every recognized partial area, its sight line inducing direction and its probability are respectively calculated and displayed, and the flowing path of the sight line of the user observing said image information is estimated and displayed on a basis of this display.

17. The sight line inducing information display method according to claim 16, the flowing path of the sight line of said user being calculated by limiting the paths to a path going via a designated partial area by computer.

18. The sight line inducing information display method according to claim 17, said partial area being sequentially designated from a large initial noticing probability by said computer.

19. The sight line inducing information display method according to claim 16, the flowing path of the sight line of said user being calculated with a designated partial area as a starting point or a terminal point by said computer.

20. The sight line inducing information display method according to claim 19, said computer designating a largest initial noticing probability in the partial area as the starting point of said path calculation.

21. A sight line inducing information display method using a computer so as to estimate and display a flowing path of a sight line of a user observing image information having plural partial areas arranged as a list, comprising:

after said computer recognizes said image information by dividing said image information into the partial areas, an initial noticing probability every recognized partial area, its sight line inducing direction and its probability are respectively calculated, and the flowing path of the sight line is calculated together with its probability from these calculating results by a combination of the probabilities, and the flowing path of the sight line of the user observing this image information is estimated and displayed on a basis of this display.

* * * * *